US012129987B1

(12) United States Patent
D'Ascanio et al.

(10) Patent No.: US 12,129,987 B1
(45) Date of Patent: Oct. 29, 2024

(54) LANDSCAPE LIGHTING FIXTURE WITH ADJUSTABLE BOLLARD SHROUD

(71) Applicants: Franco L D'Ascanio, Key Colony Beach, FL (US); Sean P Snowden, Marathon, FL (US); Harold Zimmermann, Riverton, NJ (US)

(72) Inventors: Franco L D'Ascanio, Key Colony Beach, FL (US); Sean P Snowden, Marathon, FL (US); Harold Zimmermann, Riverton, NJ (US)

(73) Assignee: COASTAL SOURCE, LLC, Marathon, FL (US)

( * ) Notice: Subject to any disclaimer, the term of this patent is extended or adjusted under 35 U.S.C. 154(b) by 0 days.

(21) Appl. No.: 18/748,402

(22) Filed: Jun. 20, 2024

(51) Int. Cl.

| | |
|---|---|
| ***F21S 8/08*** | (2006.01) |
| ***F21V 1/14*** | (2006.01) |
| ***F21V 14/08*** | (2006.01) |
| ***F21V 17/00*** | (2006.01) |
| ***F21V 17/06*** | (2006.01) |
| ***F21V 23/00*** | (2015.01) |
| ***F21V 23/06*** | (2006.01) |
| ***F21W 131/109*** | (2006.01) |
| ***F21Y 115/10*** | (2016.01) |

(52) U.S. Cl.
CPC .............. *F21S 8/083* (2013.01); *F21V 1/146* (2013.01); *F21V 14/08* (2013.01); *F21V 17/002* (2013.01); *F21V 17/06* (2013.01); *F21V 23/001* (2013.01); *F21V 23/06* (2013.01); *F21W 2131/109* (2013.01); *F21Y 2115/10* (2016.08)

(58) Field of Classification Search
CPC .......... F21S 8/083; F21V 1/146; F21V 14/08; F21V 17/002; F21V 17/06; F21V 23/001; F21V 23/06; F21V 21/0824; F21V 33/006; F21W 2131/109; F21Y 2115/10
See application file for complete search history.

(56) References Cited

U.S. PATENT DOCUMENTS

| | | | | |
|---|---|---|---|---|
| 5,055,987 | A * | 10/1991 | Ellson | F21V 14/04 362/322 |
| 6,402,337 | B1 * | 6/2002 | LeVasseur | F21V 21/06 362/153.1 |
| 11,402,079 | B1 * | 8/2022 | Bucher | F21S 8/081 |
| 2020/0173630 | A1 * | 6/2020 | Zhang | F21V 17/104 |

* cited by examiner

*Primary Examiner* — Peggy A Neils
(74) *Attorney, Agent, or Firm* — Stuart M. Goldstein

(57) ABSTRACT

A landscape lighting fixture utilizes a cylindrical bollard shroud member which houses an electrical light source, e.g. an LED module. The shroud number extends upwardly from an elongated riser element. A vertically adjustable path hat support system affixed to a path hat circumscribes the shroud member, thereby allowing the path hat to be vertically adjustable in relation to the shroud member. The path hat and path hat support system can also be vertically adjustable along the riser element, without an attached shroud member. In either case, the adjustability of the path hat allows the lighting fixture to provide a wider or narrower light beam angle from the light source without adjusting the illumination from the light source.

11 Claims, 9 Drawing Sheets

24
10a
4
16

24
28
22
34
35
30
26
10a 24
4
16

24
28
22
34
30
26
10a

LANDSCAPE LIGHTING FIXTURE WITH ADJUSTABLE BOLLARD SHROUD

FIELD OF THE INVENTION

This invention relates to electrical landscape lighting fixtures and particularly to decorative lighting fixtures with adjustable components providing a variety of illuminating effects.

BACKGROUND OF THE INVENTION

The typical outdoor lighting system designed to illuminate and often to enhance the look of exterior landscapes, usually consists of a variety of different lighting fixtures. Each fixture in the system is designed to provide a specific illuminating effect. These effects can normally only be changed by increasing or decreasing the fixture's illumination by substituting different lighting sources or using dimmers or like components. Illumination effects cannot be altered by simple adjustment of and at the fixture itself.

SUMMARY OF THE INVENTION

It is thus the object of the present invention to provide a landscape lighting fixture with a bollard shroud which is easily and simply adjustable, in order to produce different lighting beam widths and thus a variety of lighting effects.

These and other objects are accomplished by the present invention, a landscape lighting fixture utilizing a cylindrical bollard shroud member which houses an electrical light source, e.g. an LED module. The shroud member extends upwardly from an elongated riser element. A vertically adjustable path hat support system affixed to a path hat circumscribes the shroud member, thereby allowing the path hat to be vertically adjustable in relation to the shroud member. The path hat support system with the path hat can also be vertically adjustable along the riser element, without an attached shroud member. In either case, the adjustability of the path hat allows the lighting fixture to provide a wider or narrower light beam angle from the light source without adjusting the illumination from the light source.

DETAILED DESCRIPTION OF THE INVENTION

Figure 2:
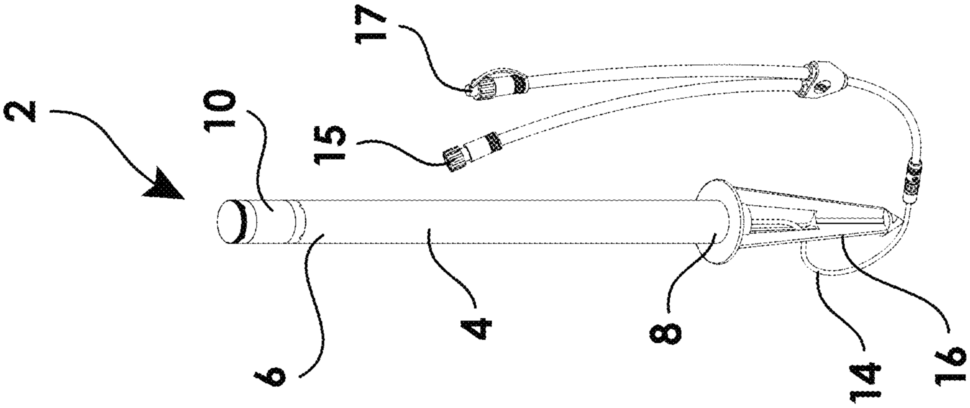
FIG. 2 is a perspective view of the lighting fixture of the present invention without the path hat mounted thereon.
Figure 1:
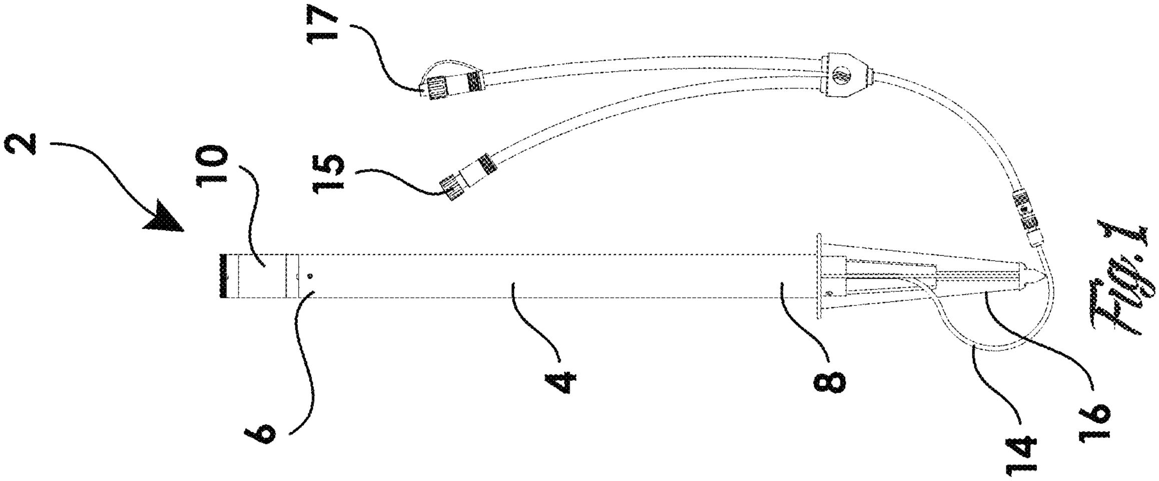
FIG. 1 is a front view of the lighting fixture of the present invention without the path hat mounted thereon.
Figure 5:
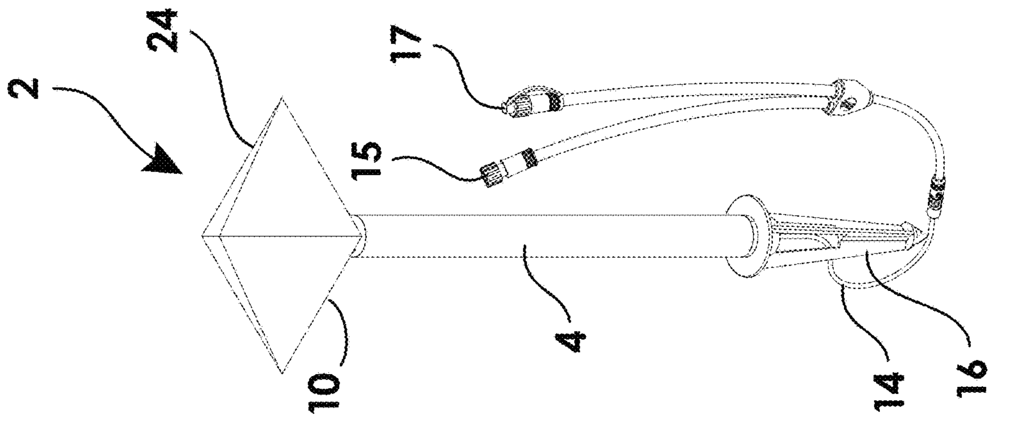
FIG. 5 is a perspective view of the lighting fixture of the present invention with the path hat mounted thereon.
Figure 4:
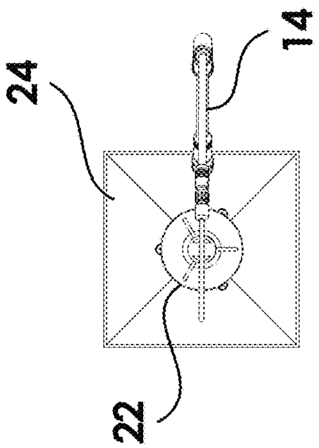
FIG. 4 is a top view of the lighting fixture of the present invention shown in FIG. 3.
Figure 3:
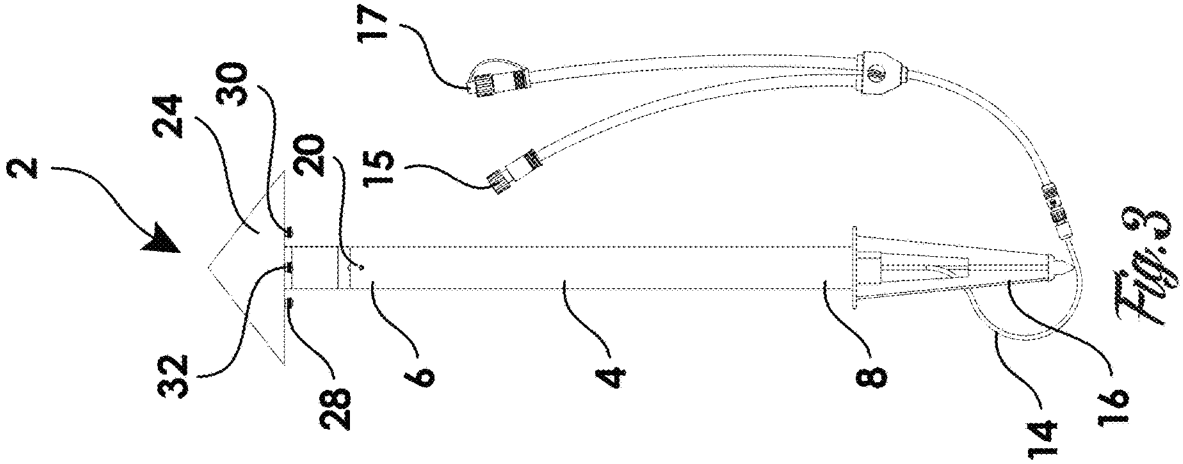
FIG. 3 is a front view of the lighting fixture of the present invention with the path hat mounted thereon.
Figure 6:
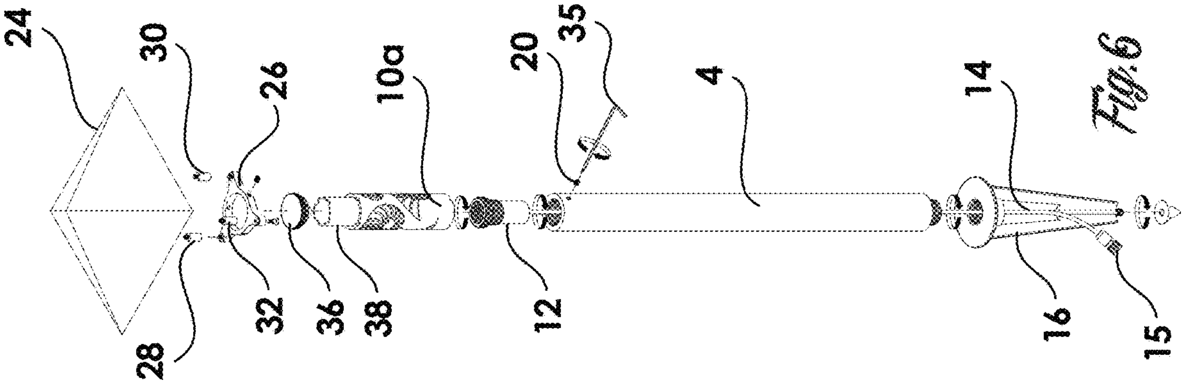
FIG. 6 is an exploded view of the lighting fixture of the present invention.
Figure 10:
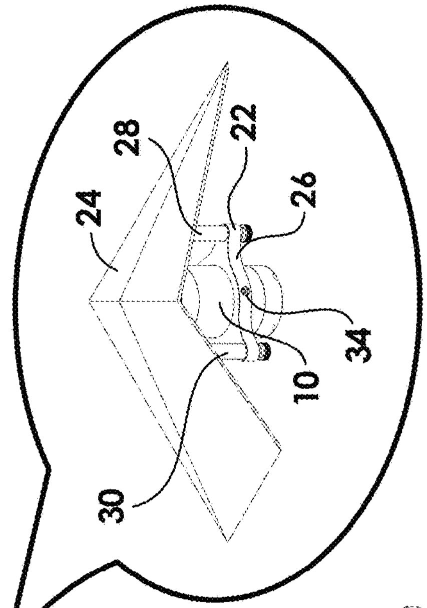
FIG. 10 is a detailed view of the path hat and path hat support system of the lighting fixture of the present invention taken from FIG. 9.
Figure 9:
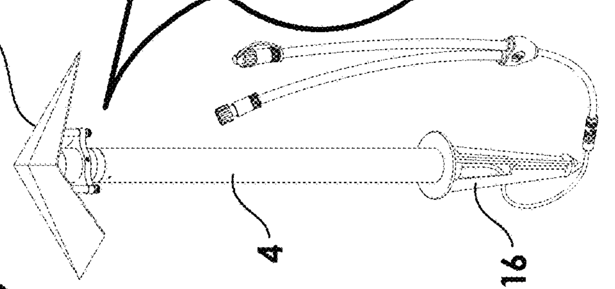
FIG. 9 is a partial section view of the present invention showing a lower position of the path hat on the bollard shroud of the lighting fixture of the present invention.
Figure 8:
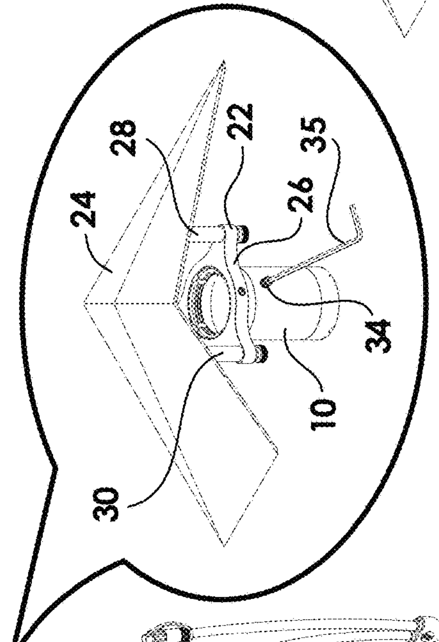
FIG. 8 is a detailed view of the path hat and path hat support system of the lighting fixture of the present invention taken from FIG. 7.
Figure 7:
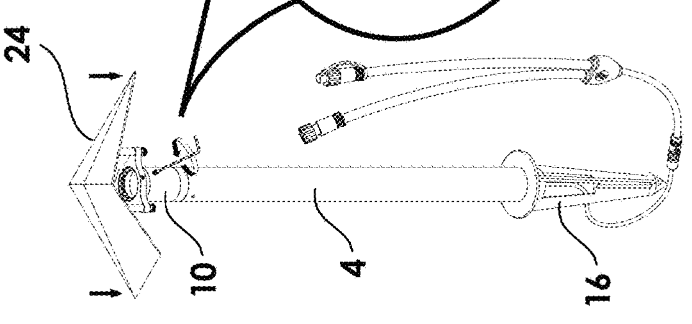
FIG. 7 is a partial section view illustrating the manner of adjustment of the path hat of the lighting fixture of the present invention.

Landscape lighting fixture 2 comprises elongated riser element 4 having upper end 6 and lower end 8. Clear cylindrical bollard shroud member 10 is located on and extends upwardly from upper end 6 of riser element 4. Shroud member 10 houses lighting source in the form of a directional LED module 12. Electrical wiring 14 extends from LED module 12 through riser element 4 to electrical connectors 15 and 17 extending from the wiring at lower end 8 of the riser element. Ground penetrating member 16 is also located and connected by threading at lower end 8 of riser 4. Likewise, LED module 12 is threadably connected to riser element 4 at the top of the riser element (see FIG. 6).

Figure 12:
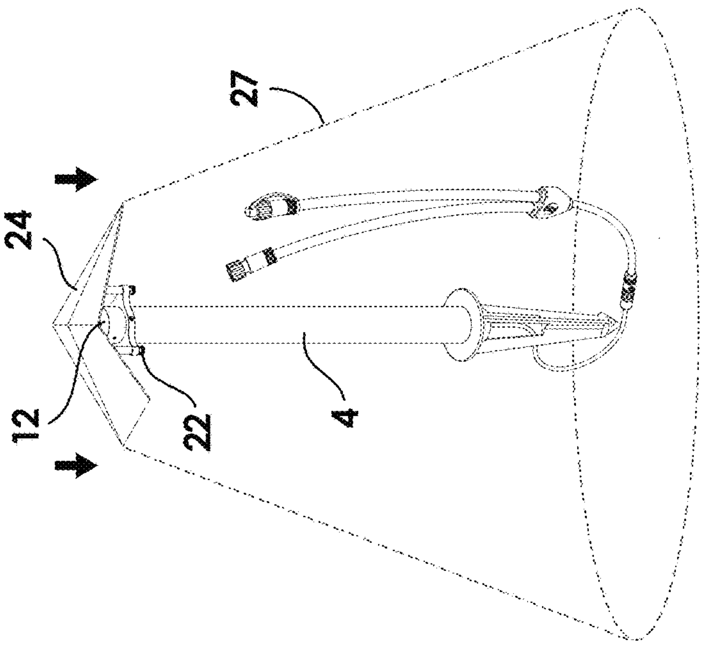
FIG. 12 illustrates how the lighting fixture of the present invention creates a light beam which is narrower than the beam shown in FIG. 11, with the path hat and path hat system vertically adjustable along the riser element.
Figure 11:
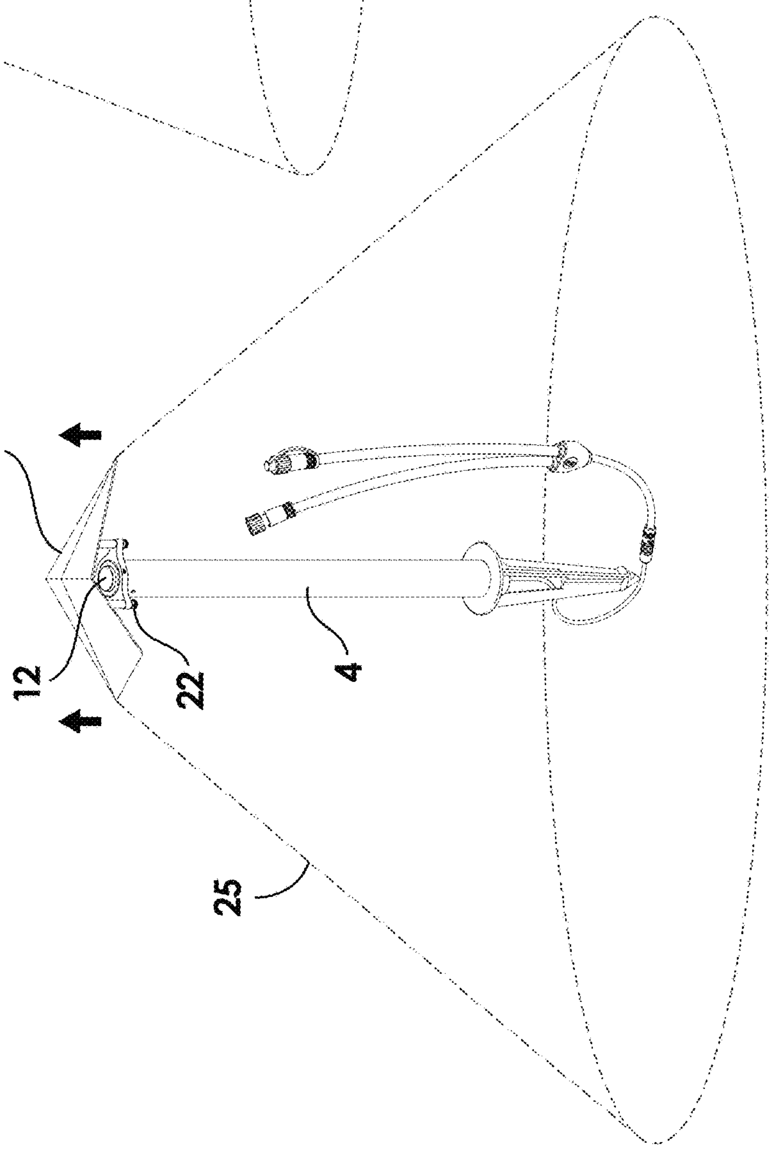
FIG. 11 illustrates how the lighting fixture of the present invention creates a wide light beam, in this case, with the path hat and path hat system vertically adjustable along the riser element.
Figure 13:
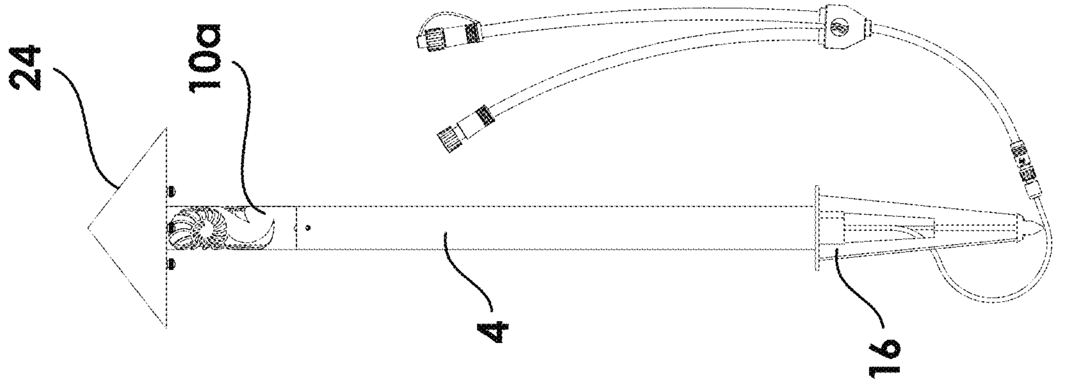
FIG. 13 is a front view of the lighting fixture of the present invention with a decorative bollard shroud.
Figures 14, 15, 16, 17:
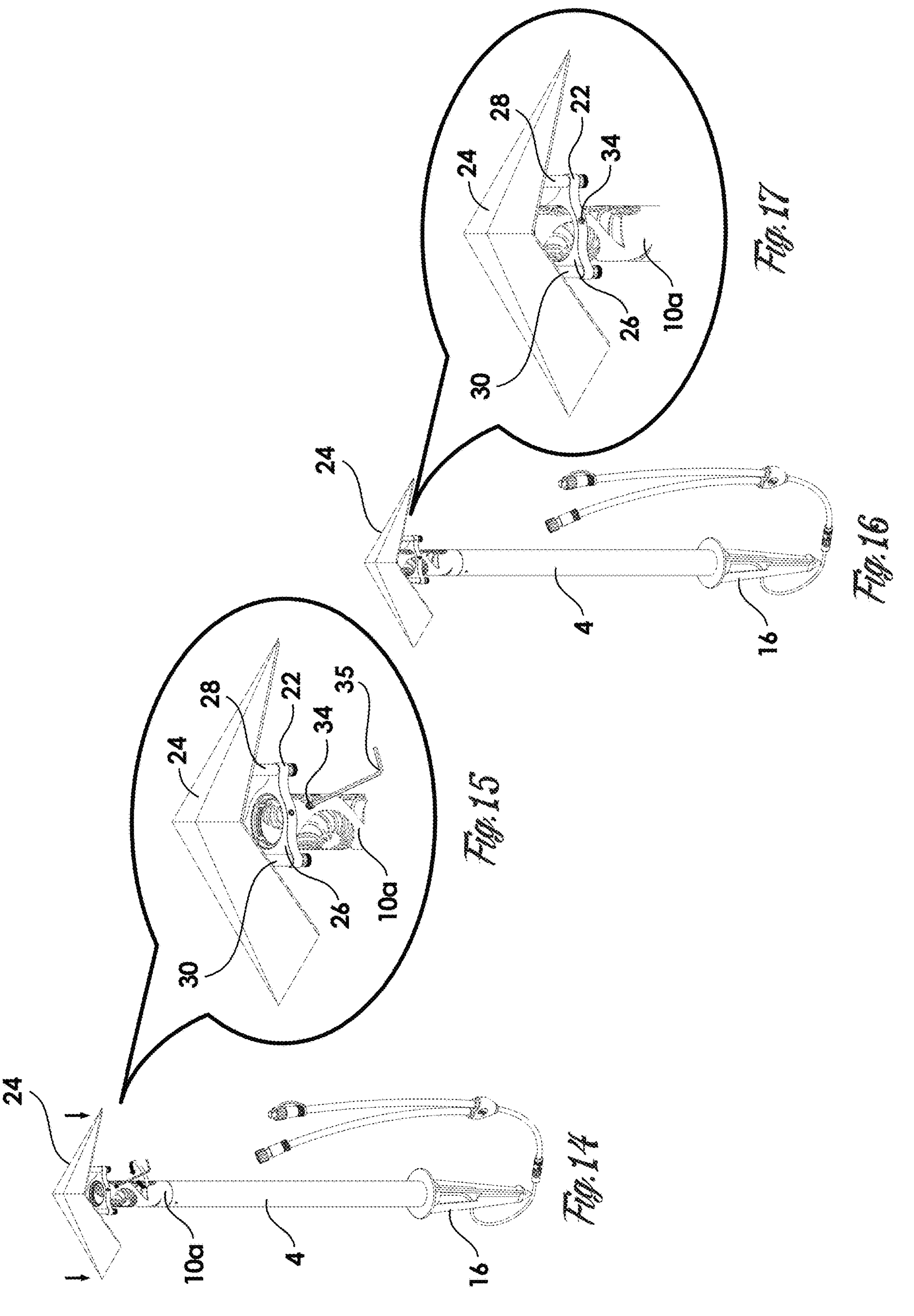
FIG. 14 is partial section view illustrating the manner of adjustment of the path hat of the lighting fixture at the present invention utilizing the bollard shroud shown in FIG. 13.
FIG. 15 a detailed section view of the lighting fixture of the present invention taken from FIG. 14.
FIG. 16 is a partial section view of the lighting fixture of the present showing a lower position of the path hat on the bollard shroud shown in FIG. 13.
FIG. 17 is a detailed view of the path hat and path hat support system of the lighting fixture of the present invention taken from FIG. 16.

First connection means in the form of set screw 20 removably secures shroud member 10 to riser element 4 by rotation of Allen wrench 35. Second connection means in the form of path hat support system 22 affixes path hat 24 to shroud number 10. Path hat support system 22 comprises path hat armature 26 which circumscribes shroud member 10, a plurality of arm elements 28, 30, and 32, each upstanding from the path hat armature to path hat 24, and set screw connector 34 which removably secures the path hat support system and the path hat to the shroud member by rotation of Allen wrench 35. Path hat support system 22 can also be positioned directly around riser element 4, without utilizing an attached shroud member. In this case, set screw connector 34 would affix path hat support system 22 and path hat 24 to riser element 4. Thus, path hat support system 22 allows path hat 24 to be vertically adjustable along both shroud member 10, as seen in FIGS. 7-10, and riser element 4, as seen in FIGS. 11 and 12.

By vertically adjusting path hat 24, a wider or narrower light beam angle emanating from a light source is created without having to adjust the illumination from the light source. As best seen in FIG. 11, LED module 12 is the light source located within riser element 4. The higher path hat 24 is positioned along riser element 4, the wider the light beam angle 25. FIG. 12 illustrates that the lower path hat 24 is positioned along riser element 4, the narrower the light beam angle 27. Once the desired position of path hat 24 is attained, screw connector 34 is tightened to maintain this position.

Figure 18:
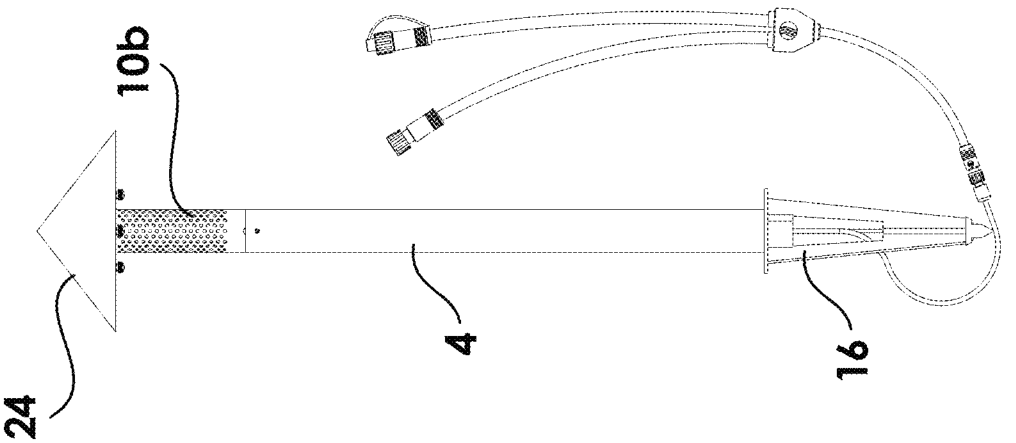
FIG. 18 is a front view of the lighting fixture of the present invention with another decorative bollard shroud.
Figure 19:
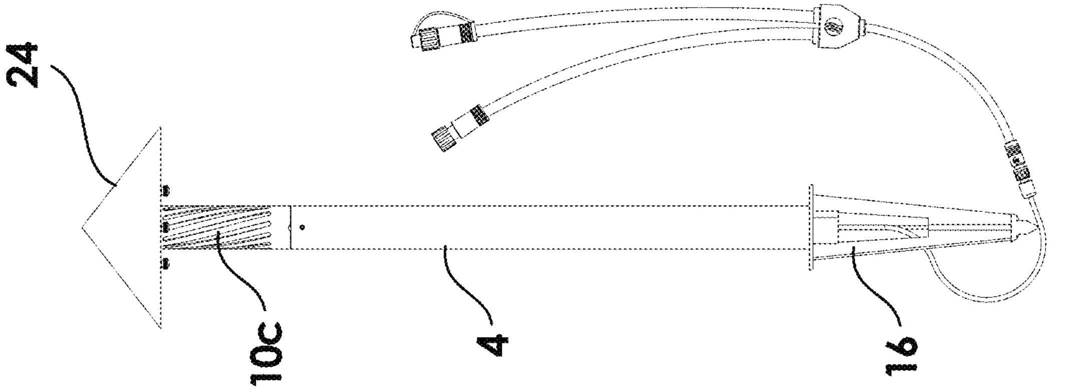
FIG. 19 is a front view of the lighting fixture of the present and pension with still another decorative bollard shroud.

When the present invention uses shroud member 10, it houses LED module 12, knurled cap with reflector 36 and diffuser 38. Shroud member 10*a*, itself, has a decorative nautilus design. It is contemplated that many different bollard shroud members with different decorative designs, e.g. 10*b* and 10*c*, can be utilized, as seen in FIGS. 18 and 19 respectively. The shroud members utilized in the invention can be decorative, like shroud members 10*a*, 10*b*, and 10*c*, or without decorative design, as illustrated by shroud member 10. However, the bollard shroud members which are used in accordance with the present invention are not to be considered restricted to those disclosed herein. It is contemplated that any shroud member, with decorative design or without, is encompassed within the scope of the invention.

Shroud members are interchangeable. For instance, removal of set screw 34 will allow path hat support system 22 and path hat 24 to be lifted off shroud member 10. A second shroud member 10*a* having the nautilus design, is next positioned over riser element 4 and secured in place by set screw 20, as illustrated in FIGS. 12-16. Path hat support system 22 can then be installed over shroud member 10*a*. Path hat support 22 adjusted is to the desired height. It is then affixed to that height by means of set screw 34.

Certain novel features and components of this invention are disclosed in detail in order to make the invention clear in at least one form thereof. However, it is to be clearly understood that the invention as disclosed is not necessarily limited to the exact form and details as disclosed, since it is apparent that various modifications and changes may be made without departing from the spirit of the invention.

The invention claimed is:

1. A landscape lighting fixture comprising:

an elongated riser element having an upper end and a lower end, an electrical wiring extending through the riser element to electrical connectors, and a ground penetrating member extending from the lower end;

a cylindrical bollard shroud member housing an electrical light source, said shroud member extending upwardly from the upper end of the riser element;

first connection means for removably securing the shroud member to the riser element;

a path hat affixed to the shroud member; and second connection means for affixing the path hat to the shroud member, said second connection means comprising a path hat support system having a path hat armature which circumscribes the shroud member, a plurality of arm elements extending up from the path hat armature to the path hat, and a screw connector for affixing the path hat to the shroud;

wherein the path hat is vertically adjustable in relation to the shroud member to provide a wider or narrower light beam angle from the light source without adjusting the illumination from the light source.

2. The landscape lighting fixture as in claim 1 wherein the path hat support system is configured to be movable along the shroud member in order to vertically adjust the path hat in relation to the shroud member and to affix the path hat in different locations along the shroud.

3. The landscape lighting fixture as in claim 1 wherein the first connection means comprises a screw component, whereby when the screw component is removed, the shroud member is detachable from the riser element.

4. The landscape lighting fixture as in claim 3 wherein when the shroud member is detached from the riser element, a second shroud member is provided to be attached to the riser element by the first connection means.

5. The landscape lighting fixture as in claim 1 wherein the shroud member is a decorative shroud member.

6. The landscape lighting fixture as in claim 4 wherein the second shroud member is a decorative shroud member.

7. The landscape lighting fixture is in claim 1 wherein the electrical light source is a directional LED module.

8. The landscape lighting fixture is in claim 1 wherein the shroud member is a clear shroud member.

9. A landscape lighting fixture comprising:

an elongated riser element having an upper end and a lower end, an electrical light source located at the upper end of the riser element, wiring extending through the riser element from the light source to electrical connectors, and a ground penetrating member extending from the lower end;

a path hat affixed to the riser element; and connection means for affixing the path hat to the riser element, said connection means comprising a path hat support system having a path hat armature which circumscribes the riser element, a plurality of arm elements extending up from the path hat armature to the path hat, and a screw connector for affixing the path hat to the riser element;

wherein the path hat is vertically adjustable in relation to the riser element to provide a wider or narrower light beam angle from the light source without adjusting the illumination from the light source.

10. The landscape lighting fixture as in claim 9 wherein the path hat support system is configured to be movable along the riser element in order to vertically adjust the path hat in relation to the riser element and to affix the path hat in different locations along the riser element.

11. The landscape lighting fixture as in claim 9 wherein the electrical light source is a directional LED module.

* * * * *